UNITED STATES PATENT OFFICE.

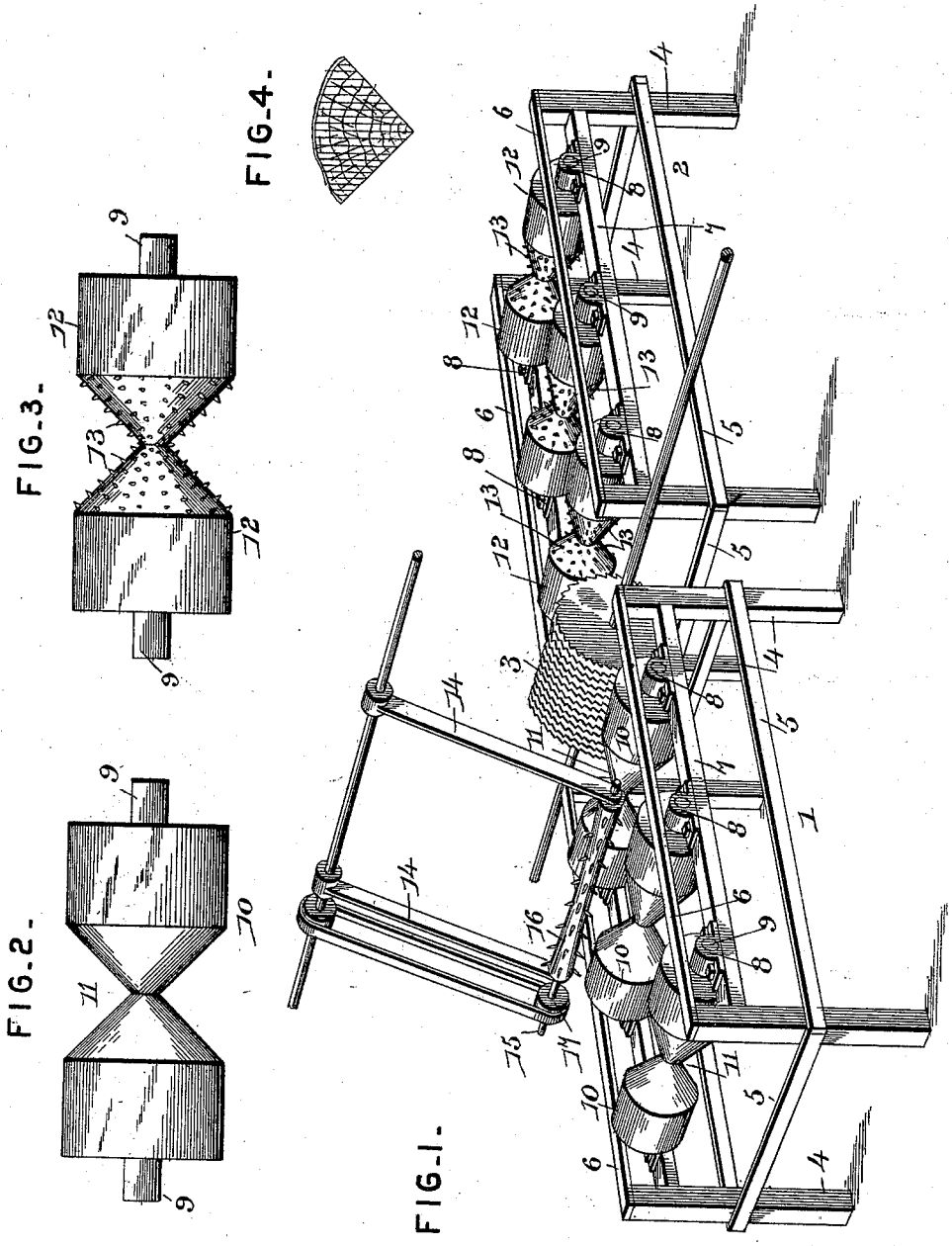

MILES EDWARD DAVIDSON, OF HELENA, ARKANSAS.

SAWMILL.

SPECIFICATION forming part of Letters Patent No. 561,569, dated June 9, 1896.

Application filed May 21, 1895. Serial No. 550,117. (No model.)

*To all whom it may concern:*

Be it known that I, MILES EDWARD DAVIDSON, a citizen of the United States, residing at Helena, in the county of Phillips and State of Arkansas, have invented a new and useful Sawmill, of which the following is a specification.

This invention relates to sawmills, and has special reference to the feeding mechanism thereof by means of which a section of log is fed in the desired relation to the saw and the resultant boards delivered therefrom.

The object of the present invention is to provide a sawmill having one or a gang of circular saws, with a series of feed-rollers of novel construction, each having a V-shaped groove, the opposite walls of which are at right angles to each other and arranged in the plane of said saw or saws, whereby a quarter-log is adapted to be fed to the saw, angle or apex downward, in such manner that the boards cut from the log will exhibit the radial streaks and fibers of the wood and produce what is known in the furniture trade as "quarter-sawed" lumber.

A further object is to provide correspondingly-formed rollers, arranged behind the saw or saws and in the plane thereof, by means of which the boards may be conveyed away from the saw or saws without the liability of the boards jamming together and interfering with the work.

To accomplish the objects above mentioned, the invention consists in certain novel features of construction and arrangement of parts, as hereinafter fully described, illustrated in the drawings, and embodied in the claims.

In the accompanying drawings, Figure 1 is a perspective view of an improved sawmill or a sufficient portion thereof to show the form of the improved feed-rollers and their disposition with relation to the saw or saws. Fig. 2 is a plan view of one of the feed-rollers of the delivering-carrier. Fig. 3 is a similar view of one of the feed-rollers of the receiving-carrier. Fig. 4 is an end elevation of a quarter-log, illustrating the manner in which the same is sawed up into boards as contemplated by this invention.

Similar numerals of reference designate corresponding parts in the several figures of the drawings.

In carrying out the invention herein contemplated a pair of supporting-frames 1 and 2 are employed, which are substantially similar in construction and are arranged one in front of and the other in rear of a circular saw or a series of such saws arranged in parallelism, as shown at 3. Each of said supporting-frames comprises, essentially, four upright corner posts or standards 4, which are connected by means of longitudinal and transverse timbers 5, intermediate their ends. The upper ends of said corner-posts are also connected by longitudinal timbers 6, and just beneath the latter are arranged beams 7, which extend longitudinally of the frame between the corner-posts 4, and are secured thereto in any convenient manner. Suitable bearings 8, secured to the upper faces of said beams and arranged in oppositely-disposed pairs, receive the end journals or trunnions 9 of a series of feed-rollers, as shown in the drawings.

The feed-rollers 10 of the primary or delivering carrier are arranged in the plane of the saw or saws and are made of suitable length and diameter and are provided with longitudinally-alined V-shaped grooves or depressions 11 directly in the plane of the saw or saws. The groove 11 in each feed-roller is annular and comprises two similar but reversely-inclined side walls, which are arranged at exactly right angles to each other. The groove in each roller thus formed constitutes a right-angled seat and is adapted to receive and snugly fit and support a quarter-log, or, more accurately speaking, one-fourth of a log or tree which has been sawed or ripped lengthwise into four equal and similar sections or quadrants. By arranging the feed-rollers 10 so that the V-shaped grooves therein will be brought into horizontal alinement and in the plane of the saw or saws a quartered log may be presented thereto with the angle or apex downward and firmly retained in such position while being sawed up into boards. In this manner the gang-saws, which are arranged on a horizontal shaft and therefore cut vertically through the quarter-log, will cut through the radial streaks or fibers of the log obliquely or diagonally, as indicated in Fig. 4, and as will be readily understood.

The receiving-carrier frame is similar to the frame 1 above described, and the feed-rollers are arranged about in the same relative positions and are substantially the same as the feed-rollers 10, being formed each with the annular groove or depression in the plane of the saw or saws, the sides of which are at exactly right angles to each other. These latter rollers, however, (indicated at 12,) are provided with metal points or barbs 13, projecting radially from the side walls of the right-angled grooves or depressions therein. A sufficiently large number of such points or barbs are employed to engage positively the lower inclined edges of each and all of the boards as they pass outward from the gang-saws for the purpose of preventing said boards from sliding down the inclined walls of the right-angled grooves and crowding together, thus preventing said boards from binding against and heating the saws.

In order to provide a positive feed for forcing the quarter-logs toward and through the gang-saws, I provide an overhead swinging frame comprising a pair of parallel arms 14, the upper ends of which may be hinged to overhead rafters or other convenient points of support. These arms are made of sufficient length so that they may incline downwardly, as indicated in the drawings, and are adapted to carry in their lower ends a horizontal shaft 15, which extends across between said arms and has a spiked or barbed feed-roller 16 keyed thereto and arranged between said arms. Said feed-roller is adapted to rest against the upper face of the quarter-log, and the shaft 15 of said roller is extended at one end outside of one of the arms 14, where it receives a pulley 17, from which a driving-belt extends upwardly over a pulley arranged about in line with the pivots or shaft on which the upper ends of the arms 14 are mounted. In this manner the feed-roller 16 may be driven at whatever angle the arms 14 may assume, and the quarter-log is fed to the saws by the positive engagement of the spiked or barbed roller 16 therewith.

The carrying device above described is very simple in construction, but is thoroughly efficient in practice, and serves to firmly and properly support a quarter-log and present the same in the proper relation to the saws to enable the latter to cut obliquely through the grain of the wood for producing what is known as "quarter-sawed" lumber.

Having thus described the invention, what is claimed as new, and desired to be secured by Letters Patent, is—

1. In a feeding mechanism for sawmills, the combination with a plurality of saws arranged in parallelism, of a feed-roller arranged behind said saws and provided with an annular V-shaped groove the side walls of which are reversely inclined and disposed at right angles to each other, and a multiplicity of pins or barbs arranged within said groove and disposed in a plurality of circular series adapted to engage the inclined edges of the boards as they are received from the saws, said groove being arranged in the plane of the saws, for the purpose and substantially as described.

2. In a feeding mechanism for sawmills, the combination with a plurality of saws arranged in parallelism, of a feed-roller arranged in front of said saws and provided with a V-shaped annular groove in the plane of the saws, another feed-roller arranged in rear of the saws and having a V-shaped groove in the plane of the saws and provided with a multiplicity of spikes or barbs, the walls of the grooves of both feed-rollers being reversely inclined and at right angles to each other, and a superposed swinging frame carrying a revoluble spiked or barbed positive-feed roller, all arranged for joint operation substantially as described.

In testimony that I claim the foregoing as my own I have hereto affixed my signature in the presence of two witnesses.

MILES EDWARD DAVIDSON.

Witnesses:
 WALTER LUYS,
 M. E. WEST.